May 15, 1934.  J. F. O'CONNOR  1,958,637
FRICTION SHOCK ABSORBING MECHANISM
Filed June 18, 1928   2 Sheets—Sheet 2
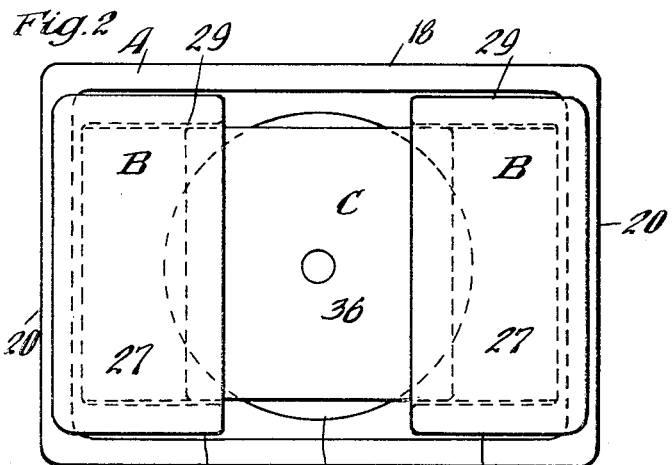
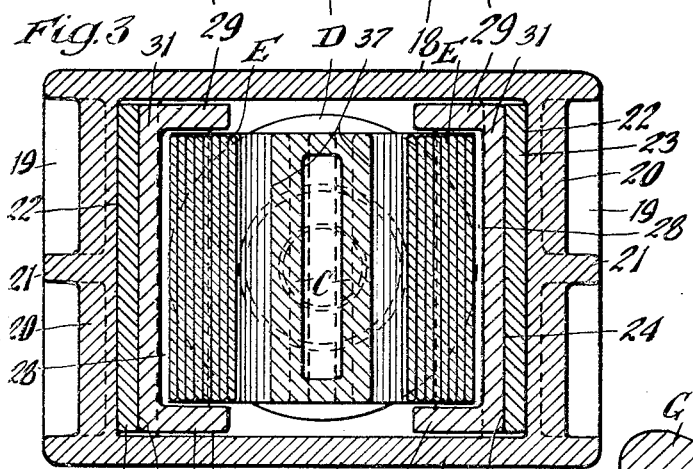
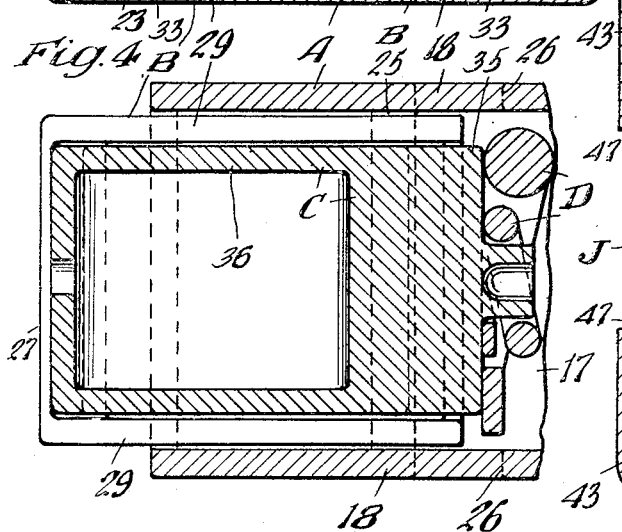
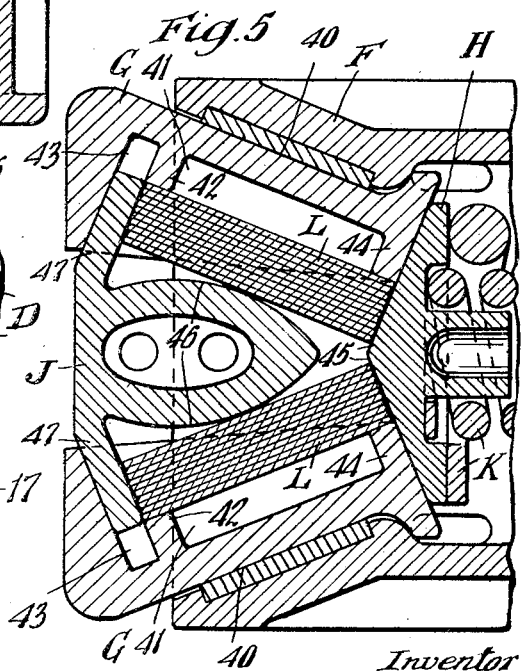
Witness
Wm. Geiger
Inventor
John F. O'Connor
By Joseph Harris
His Atty.

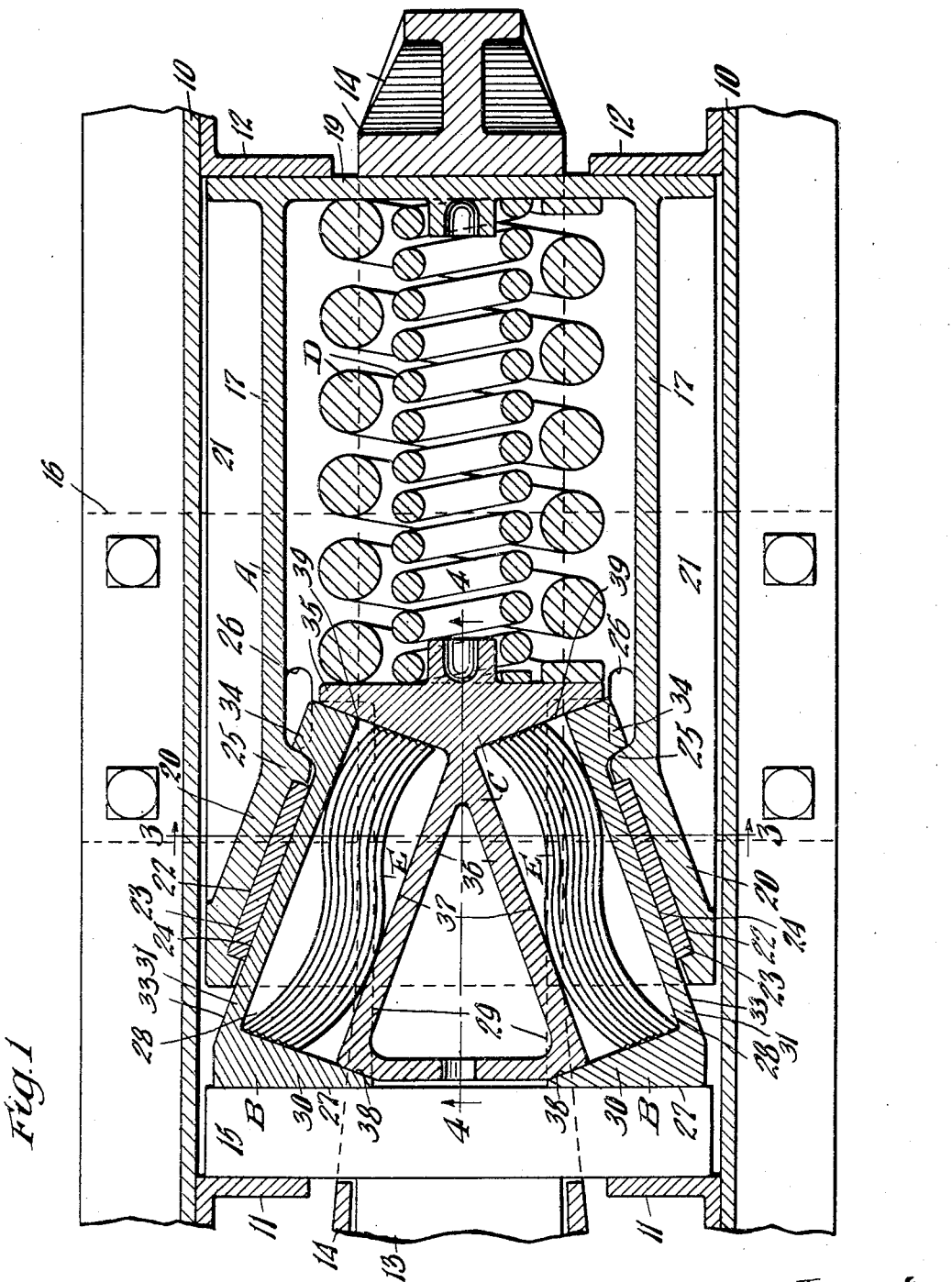

Patented May 15, 1934

1,958,637

UNITED STATES PATENT OFFICE 1,958,637

FRICTION SHOCK ABSORBING MECHANISM

John F. O'Connor, Chicago, Ill., assignor to W. H. Miner, Inc., Chicago, Ill., a corporation of Delaware Application June 18, 1928, Serial No. 286,172

11 Claims. (Cl. 213—30)

This invention relates to improvements in friction shock absorbing mechanism.

One object of the invention is to provide a friction shock absorbing mechanism for railway draft riggings, including a casing provided with opposed friction wedge surfaces and a spring resisted pair of wedge shoes cooperating with the casing surfaces, wherein relative approach of the shoes is yieldingly resisted and the shoes are held separated by spring means including a plurality of resilient plates, the plates being arranged in two groups at opposite sides of the mechanism and having engagement with a centrally disposed spacing and bearing member.

Another object of the invention is to provide a friction shock absorbing mechanism of the character indicated, including a casing having opposed, interior friction wedge faces, a pair of friction wedge shoes cooperating therewith, movement of the shoes inwardly of the casing being yieldingly opposed and relative lateral approach of the shoes being yieldingly resisted by spring means comprising a plurality of resilient plates housed in pockets in the shoes and having bearing engagement with a spacing member interposed between said plates, wherein abutment means is provided for the opposite ends of the spring plates to prevent relative displacement of the plates and cooperating parts of the mechanism longitudinally during operation of the gear, thereby reducing the wear of the parts and prolonging the life of the mechanism.

A further object of the invention is to provide a spring resistance for shock absorbing mechanisms, including plate spring means of ogee curved form, wherein the reversely curved sections of the spring means are of different amplitude, whereby compression of said spring between parallel pressure transmitting surfaces will be effected progressively, thereby providing progressively increasing resistance.

Other and further objects of the invention will more clearly appear from the description and claims hereinafter following.

In the drawings, forming a part of this specification, Figure 1 is a horizontal, longitudinal, sectional view of a portion of the underframe structure of a railway car, illustrating my improvements in connection therewith. Figure 2 is a front end elevational view of the shock absorbing mechanism proper, embodying my improvements. Figure 3 is a vertical, transverse, sectional view, corresponding substantially to the line 3—3 of Figure 1. Figure 4 is a longitudinal, vertical, sectional view of the front end portion of my improved mechanism, corresponding substantially to the line 4—4 of Figure 1. And Figure 5 is a view similar to Figure 1 of the front end portion of the shock absorbing mechanism, illustrating a different embodiment of the invention.

Referring first to the embodiment of the invention illustrated in Figures 1 to 4, inclusive, 10—10 designate channel-shaped center or draft sills of the railway car underframe, to the inner sides of which are secured front stop lugs 11—11 and rear stop lugs 12—12. The inner end of the coupler shank is designated by 13, to which is connected a hooded yoke 14 of well known form. My improved shock absorbing mechanism and a front main follower 15 are disposed within the yoke and the yoke in turn is supported by a saddle plate 16 detachably secured to the draft sills.

My improved shock absorbing mechanism, as illustrated in Figures 1 to 4, inclusive, comprises, broadly, a casing A; a pair of friction shoes B—B; a combined spring follower and spacing member C; a main spring resistance D; and two laminated plate springs E—E.

The casing A is in the form of a hollow, boxlike member, having longitudinally disposed, spaced side walls 17—17, horizontally disposed, longitudinally extending, spaced top and bottom walls 18—18, and a transverse rear end wall 19. As clearly shown in Figure 1, the end wall 19 extends on opposite sides of the side walls and cooperates with the rear stop lugs 12 in the manner of the usual rear follower. At the forward end of the casing A, the side walls 17 are inclined outwardly, as indicated at 20, the portions 20 being thickened, as shown. Between the wall sections 20 and the projecting portions of the end wall 19, the casing is reinforced longitudinally by horizontal webs 21—21.

The side wall sections 20 of the casing are interiorly recessed, as indicated at 22, to provide pockets in which are held liners 23—23. As shown, the liners 23 present opposed, interior, flat friction wedge faces 24—24 which cooperate with the friction wedge shoes B. The inner end portions of the wall sections 20 are inwardly offset with respect to the side wall sections 17, as shown, to provide limiting shoulders 25 which cooperate with limiting means on the shoes, to hold the latter assembled with the casing and restrict the outward movement thereof. Rearwardly of the shoulders 25, the top and bottom walls of the casing are provided with aligned openings 26, adapted to receive vertically disposed key members, not shown, which are employed in removing the parts of the friction wedge system from the casing A.

The friction wedge shoes B are disposed at opposite sides of the mechanism and each shoe presents a flat front end face 27 which bears directly on the inner side of the main follower 15. Each shoe B is cut away on the inner side to provide a pocket 28, adapted to accommodate one of the groups of spring plates E, the pocket being defined by top and bottom walls 29—29, a front end wall 30 and an inner side wall 31. As shown in Figure 1, the inner side walls 31 of the two shoes converge inwardly of the mechanism and are disposed parallel to the corresponding friction wedge surfaces of the liners 23. The front end wall 30 of each pocket is disposed at right angles to the wall 31. On the outer side, each shoe is provided with a longitudinally disposed flat face 33 which cooperates with the friction wedge face of the liner 23 at the corresponding side of the mechanism.

The outer faces 33 of the shoes are inclined to the longitudinal axis of the mechanism so as to provide a substantial wedging angle. At the inner end, each shoe is provided with a lateral, outwardly extending projection 34 adapted to engage in back of the limiting shoulder 25 at the corresponding side of the casing.

The combined spring follower and spacing member C comprises a spring follower section proper 35, having a forwardly extending post section 36 which forms the spacing member. As shown, the post section 36 is of substantially triangular horizontal section and is of hollow construction. The section 36 presents inwardly converging flat bearing surfaces 37—37 at the opposite sides thereof, the bearing surfaces 37 being preferably parallel to the corresponding inner side walls 31 of the two friction shoes. At the forward end, the section 36 presents a flat front face, cut away at opposite sides to provide angularly disposed abutment surfaces 38—38 which are correspondingly inclined to the end walls 30 of the pockets and engage therewith.

The spring follower section 35 of the member C is provided with a pair of inclined front faces 39—39 on the opposite sides thereof, which are preferably parallel to the front end walls 30 of the two shoes, respectively. The inner ends of the shoes B bear directly on the surfaces 39 of the spring follower and are also adapted to engage the inner ends of the two groups of spring plates E—E.

The main spring resistance D comprises an inner light coil and an outer heavier coil, interposed between the spring follower 35 and the rear end wall 19 of the casing. Both the spring follower and the end wall 19 of the casing A are provided with inwardly projecting lugs which engage within the inner coil of the spring resistance to hold the parts centered. The main spring resistance D is placed under initial compression when the mechanism is assembled, so as to maintain the spring follower 35 in its outermost position engaging the inner ends of the shoes.

The laminated spring means E comprises two groups of spring plates disposed respectively in the pockets 28 of the shoes B. Each plate is of ogee form in longitudinal section, as clearly shown in Figure 1. The reversely curved sections of each plate are of different amplitude, as shown, the front section being of the greater amplitude. The plates of each group are nested so that each group presents a relatively thick spring member of ogee curved section. As shown in Figure 1, the convexly curved outer surface portion at the inner end of each group bears directly on the flat wall 31 of the pocket and the forward extremity of the outermost plate also bears on said wall. The convex curved surface of the innermost plate of each group, at the forward end of the same, bears directly on the flat bearing surface 37 at the corresponding side of the spacing member C. The rear extremity of the innermost plate, as shown, is spaced an appreciable distance from the bearing surface 37. By this arrangement of plates of ogee curved section, which are nested, relative longitudinal displacement of the plates of each group is prevented, and by providing the reversely curved sections of different amplitude, the forward end portions of the two groups of spring plates will be flexed during the first part of the compression of the mechanism and the entire plates, comprising the two reversely curved sections, will be flexed during the last part of the compression. A progressive action of the plate spring resistance means is thus provided, affording increased, heavier spring resistance during the last part of the compression of the mechanism.

The plates of each group are preferably of such a length as to substantially fit between the front end walls 30 of the pockets and the abutment surfaces 39 of the spring follower when the mechanism is in full release, thereby preventing displacement of the plates of the two groups with respect to the friction wedge shoes B, thereby eliminating rattling of the plates and damage to the bearing walls of the shoes and spring follower. Inasmuch as the spring follower is held in its outermost position by the main spring resistance at all times, and the spring follower is movable rearwardly relatively to the shoes B, the elongation of the curved spring plates E, during the compression of the same, will be taken care of.

In removing the friction wedge system from the casing A, the parts are compressed until the projecting portions or lugs 34 of the shoes B are disposed inwardly of the openings 26 of the top and bottom walls of the casing. Keys are then inserted within the openings 26, the outer faces of the keys forming guide walls which cooperate with the lugs 34 of the shoes to prevent engagement of the same with the shoulders 25 of the casing when the shoes are moved outwardly. The pressure on the shoes B is removed and the spring resistance D, in expanding, forces the shoes outwardly, ejecting the entire friction wedge system from the casing.

The operation of my improved shock absorbing mechanism, as illustrated in Figures 1 to 4, inclusive, assuming a compression stroke, is as follows: The friction wedge shoes B will be forced inwardly of the casing A in unison with the main follower 15 slipping on the friction wedge faces of the liners 23. During this action, the main spring resistance will be compressed and the shoes B will be forced laterally toward each other, due to the converging relation of the friction wedge faces of the casing. During the first part of the lateral approach of the friction shoes B, the curved front end sections of the two groups of spring plates E will be flexed. This action continues until the rear end portions of the two groups of plates come into bearing relation with the bearing surfaces 37 of the spacing member, whereupon the rear end portions of the spring plates will also be flexed. As will be evident during the last part of the compression action described, the spring resistance will be greatly augmented, due to the flexing of the plates throughout their entire length. In addition to the friction created on the cooperating friction wedge faces of the shoes and casing, friction is also created between the front end faces 27 of the shoes and the main follower 15, due to the lateral inward sliding movement of the shoes on the main follower. The compression of the mechanism will continue either until the actuating force is reduced or inward movement of the follower 15 is limited by engagement with the front end of the casing A.

When the actuating force is reduced in release of the mechanism, the expansive action of the main spring resistance D will force the combined spring follower and casing member outwardly, thereby carrying the shoes outwardly also. During the outward movement of the shoes B, the laminated plate springs E will force the shoes laterally apart, thereby maintaining the same in engagement with the friction wedge faces of the casing. Outward movement of the shoes is finally limited by engagement of the lugs 34 thereof with the shoulders 25 of the casing.

Referring next to the embodiment of the invention illustrated in Figure 5, the same comprises, broadly, a casing F; a pair of friction shoes G—G; a main spring follower H; a spacing member J; a main spring resistance K; and two laminated plate springs L—L.

The casing F is of substantially the same design as the casing A, hereinbefore described, and is provided with opposed, interior friction wedge faces 40—40, with which the shoes G cooperate. Each of the shoes G is provided with an interior pocket 41, adapted to accommodate one of the laminated plate springs L. On the outer side, each shoe is provided with a flat friction wedge face which cooperates with the wedge face 40 at the corresponding side of the casing F. Each shoe is also provided with a flat front end face which corresponds to the flat front face 27 of the shoe B, hereinbefore described, and bears directly on the inner side of the main follower, not shown. The pocket 41 of each friction wedge shoe is provided with a vertically disposed rib 42 spaced from the front end wall of the pocket, thereby providing a guide slot 43 for a purpose hereinafter described.

At the inner end, the pocket 41 of each shoe is provided with a relatively short, transverse wall 44, corresponding in width to the rib 42. The rib 42 and the wall 44 form bearing projections which engage the opposite ends of the corresponding laminated plate spring L.

The spring follower H is provided with angularly disposed front end bearing surfaces 45 on the opposite sides thereof, which engage directly the inner ends of the friction wedge shoes G. As shown, the bearing faces 45, in the normal position of the parts, extend inwardly beyond the end walls 44 of the pockets of the shoes and form rear abutment members for the inner ends of the two laminated plate springs L. The main spring resistance K bears directly on the rear end wall of the casing F and has the front end thereof bearing directly on the spring follower H.

The spacing member J comprises a main body portion having curved bearing surfaces 46—46 on the opposite sides thereof, which cooperate with the inner sides of the two laminated plate springs L. At the forward end, the spacing member J is provided with a pair of lateral flanges 47—47 which are angularly disposed and engage within the slots 43 of the shoes G. The flanges 47 form front end abutments for the two laminated plate springs L and the springs are held against longitudinal displacement with respect to the shoes between the flanges 47 and the front abutment faces 45 of the spring follower H.

As shown, each laminated plate spring L comprises a plurality of flat resilient plates disposed at an inclination to the longitudinal axis of the mechanism, the two groups of plates converging inwardly, as shown in Figure 5.

In the operation of the improved shock absorbing mechanism shown in Figure 5, during inward movement of the friction shoes G, the friction shoes will be forced to approach each other laterally and the plates of the two groups L will be flexed by the action of the curved bearing surfaces 46 of the spacing member J, the front and rear ends of the plates of each group being supported by the rib 42 and the wall 44 of the corresponding friction wedge shoe G.

From the preceding description, taken in connection with the drawings, it will be evident that I have provided a friction shock absorbing mechanism comprising friction elements which are movable relatively toward each other laterally and the approach of which is spring resisted, wherein the resistance offered by the spring progressively increases during the compression of the mechanism. It is further pointed out that by providing plate spring means, sections of which are reversely curved and are of different amplitude, an efficient spring resistance is produced which affords two stages of progressively increasing resistance.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with a casing provided with interior, opposed friction wedge faces; of a pair of friction shoes having wedge faces slidably engaging said opposed faces, each of said shoes being provided with a spring pocket; a group of spring plates disposed in each pocket; a spacing member between said groups of plates, said spacing member having lateral bearing surfaces cooperating with said plates and end abutment faces engaging the plates at one end of said groups; and a main spring resistance opposing inward movement of said shoes.

2. In a shock absorbing mechanism, the combination with a pair of pressure transmitting elements relatively movable toward each other during compression of the mechanism, said elements having opposed flat bearing surfaces; of a plate spring resistance interposed between said elements, said spring resistance being of ogee curved section and the reversely curved sections thereof being of different amplitude, whereby said reversely curved sections are progressively actuated during relative approach of said pressure transmitting elements.

3. In a friction shock absorbing mechanism, the combination with a casing having interior, opposed wedge friction surfaces; of a pair of friction shoes slidably engaging said casing surfaces; a laminated plate spring resistance means interposed between said shoes, said spring resistance means including a group of plates arranged lengthwise of the mechanism; abutment means at opposite sides of said group of plates including an abutment face portion at one side of said group engaging the plates inwardly of one end, an abutment face portion at the same side of said group engaging the plates closely adjacent the other end, an abutment face portion at the other side of said group engaging the plates inwardly of said last named end, and an abutment face portion on said last named side adapted to engage the other end of said group of plates, said last named end of said group of plates being normally spaced from said last named abutment face portion and engageable therewith after a predetermined compression of the mechanism to provide for flexing of one end portion of said laminated plate spring prior to flexing of the other end thereof, thereby providing progressively increasing resistance to relative approach of the shoes; and a main spring resistance opposing inward movement of the shoes.

4. In a friction shock absorbing mechanism, the combination with a casing having opposed, interior inwardly converging friction wedge surfaces; of a pair of friction wedge shoes slidable on said surfaces; a central spacing member having outwardly diverging abutment faces on opposite sides thereof, said faces being respectively parallel to the friction wedge surfaces of the casing said shoes having interior abutment faces opposed to and disposed parallel to said abutment faces of the spacing member; a pair of longitudinally arranged laminated plate springs at opposite sides of said spacing member, interposed between the abutment faces of the same and the abutment faces of the shoes, and opposing lateral approach of said shoes; and a main follower engaging the outer ends of said shoes, said shoes having laterally inwardly extending flanges thereon at the outer ends thereof overlapping said spacing member and disposed between the outer ends of said plate springs and the main follower to shield the latter.

5. In a friction shock absorbing mechanism, the combination with a casing having opposed, interior friction wedge faces; of a pair of friction wedge shoes having sliding engagement on said wedge faces, each shoe having a spring receiving pocket on the inner side thereof, each of said pockets having an interior side wall and a transverse front wall; a spacing member between said shoes, said spacing member being at all times overlapped by said front walls of the shoes and bearing at the outer end on said transverse front walls of said shoes; longitudinally arranged spring plate members in each pocket, said plate members being confined between the spacing member and the side walls of the pockets; and a main follower engaging said shoes.

6. In a friction shock absorbing mechanism, the combination with a casing having interior, opposed, outwardly diverging friction wedge surfaces at its front end; of a pair of friction shoes slidable lengthwise on said surfaces; a pair of plate springs disposed lengthwise of the mechanism and opposing lateral approach of said shoes; a spacing member between said pair of plate springs, said spacing member having laterally outwardly projecting flanges at the front end engaging over the front ends of said plate springs and overlapping said shoes; spring means within the casing opposing inward movement of the shoes; and a main follower separated from said spacing member and bearing on the front ends of said shoes for moving the latter inwardly of the casing.

7. In a friction shock absorbing mechanism, the combination with a casing having interior, opposed, outwardly diverging friction wedge faces at its front end; of a pair of friction shoes slidable lengthwise on said faces, each shoe having a laterally inwardly projecting front wall member; a central spacing member having laterally outwardly directed flanges at the front end thereof, said flanges bearing on the rear surfaces of said front wall members of the shoes and having sliding engagement therewith; plate springs at opposite sides of the mechanism interposed between the spacing member and shoes, the front ends of said plate springs being overlapped by the flanges of the spacing member; and spring means yieldingly opposing movement of the shoes inwardly of the casing.

8. In a friction shock absorbing mechanism, the combination with a casing having interior, opposed, outwardly diverging friction wedge faces at its front end; of a pair of friction shoes slidable lengthwise on said faces, each shoe having an inwardly directed, transverse guide slot at its forward end and a spring seat on the inner side rearwardly of said guide slot; a central spacing member having laterally outwardly directed flanges at the front end thereof, said flanges having sliding engagement within the guide slots of the shoes; plate springs in said spring seats of the shoes, said plate spring being separated by said spacing member, the front ends of said plate springs being overlapped by the flanges of the spacing member; and means yieldingly opposing movement of the shoes inwardly of the casing.

9. In a friction shock absorbing mechanism, the combination with a casing having opposed, interior friction wedge faces at the forward end; of a pair of friction shoes having friction wedge faces slidingly engaging the friction wedge faces of the casing, each of said shoes having a spring pocket on the inner side thereof; a group of spring plates disposed in each pocket; a spacing member between said groups of plates, said spacing member having side bearing faces engaging said spring plates, and abutment faces at the front ends overhanging and engaging the front ends of the groups of plates; a spring follower at the inner ends of the shoes having inclined front bearing surfaces engaging said ends of the shoes; and yielding means within the casing opposing inward movement of the shoes.

10. In a friction shock absorbing mechanism, the combination with a casing having opposed, interior friction wedge faces at the forward end; of a pair of friction shoes having friction wedge faces slidingly engaging the friction wedge faces of the casing, each of said shoes having a spring pocket on the inner side thereof; a group of spring plates disposed in each pocket; a spacing member between said groups of plates, said spacing member having side bearing faces engaging said spring plates, and abutment faces at the front ends overhanging and engaging the front ends of the groups of plates; a spring follower at the inner ends of the shoes having inclined front bearing surfaces abutting the rear ends of the groups of spring plates and bearing on the inner ends of the shoes; and yielding means within the casing opposing inward movement of the shoes.

11. In friction shock absorbing mechanism, the combination with a casing having opposed, rearwardly converging, interior wedge faces at the forward end; of a pair of opposed friction shoes having wedge friction surfaces slidingly engaging said faces of the casing, said shoes having spring pockets on the inner sides thereof, the pocket of each shoe having interior, spaced, front and rear abutments, the pocket of each shoe also having a laterally inwardly projecting front wall; two groups of longitudinally arranged, flat spring plates, each group being disposed in one of said pockets and having lateral bearing engagement adjacent to its front and rear ends on said front and rear abutments of the corresponding pocket; a spacing member between said groups of plates, said spacing member having rounded side faces bearing on the groups of plates between the ends thereof, said spacing member having laterally projecting flanges bearing on the inner sides of the front walls of the shoes and having sliding engagement with said walls, said flanges overhanging the front ends of the groups of plates; and means within the casing yieldingly opposing inward movement of the shoes.

JOHN F. O'CONNOR.